(12) United States Patent
Kotzur et al.

(10) Patent No.: US 7,644,304 B2
(45) Date of Patent: Jan. 5, 2010

(54) USING SAS ADDRESS ZONING TO ADD/REPLACE HOT SPARES TO RAID SET

(75) Inventors: Gary B. Kotzur, Austin, TX (US); Kevin Marks, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 391 days.

(21) Appl. No.: 11/467,682

(22) Filed: Aug. 28, 2006

(65) Prior Publication Data

US 2008/0126849 A1 May 29, 2008

(51) Int. Cl.
*G06F 11/00* (2006.01)
(52) U.S. Cl. .................. 714/7; 714/5; 714/6; 714/42; 714/44; 711/114
(58) Field of Classification Search .............. 714/5, 714/6, 7, 42, 44; 711/114
See application file for complete search history.

(56) References Cited

U.S. PATENT DOCUMENTS

| | | | | |
|---|---|---|---|---|
| 5,479,653 | A | 12/1995 | Jones ............... | 395/182.03 |
| 6,732,233 | B2 | 5/2004 | Smith | |
| 7,035,952 | B2 * | 4/2006 | Elliott et al. ........... | 711/114 |
| 7,313,721 | B2 * | 12/2007 | Ashmore ................ | 714/7 |
| 7,373,546 | B2 * | 5/2008 | Nguyen et al. ........... | 714/5 |
| 7,406,619 | B2 * | 7/2008 | Lynn ..................... | 714/5 |
| 7,437,462 | B2 | 10/2008 | Marks et al. | |
| 2006/0101171 | A1 | 5/2006 | Grieff et al. | |
| 2006/0156060 | A1 * | 7/2006 | Forrer et al. ............ | 714/6 |
| 2006/0195624 | A1 * | 8/2006 | Chikusa et al. ........... | 710/5 |
| 2007/0266110 | A1 | 11/2007 | Chawla et al. | |
| 2008/0005470 | A1 * | 1/2008 | Davies ................ | 711/114 |

* cited by examiner

*Primary Examiner*—Robert Beausoliel
*Assistant Examiner*—Joseph D Manoskey
(74) *Attorney, Agent, or Firm*—Baker Botts L.L.P.

(57) ABSTRACT

Certain ones of a plurality of SAS hard disk drives are assigned to different SAS zones using a SAS zoning expander(s). A processor and SAS RAID controller have access to only those SAS hard disk drives assigned to the same zone(s) as the processor and SAS RAID controller. Each SAS RAID controller determines when a RAID hard disk drive in its zone fails, and then notifies the RAID hard disk drive failure to a service enclosure processor (SEP) of the SAS zoning expander. The SEP re-allocates an available hot-spare hard disk drive to the zone of the failed RAID hard disk drive. When the SAS RAID controller detects that a functional hard disk drive is now available in its zone, the RAID image is rebuilt using the zone reassigned hot-spare hard disk drive that then becomes one of the RAID hard disk drives of that zone.

23 Claims, 4 Drawing Sheets

USING SAS ADDRESS ZONING TO ADD/REPLACE HOT SPARES TO RAID SET

TECHNICAL FIELD

The present disclosure relates generally to information handling systems and, more particularly, to using serial attached SCSI (SAS) zoning to add/replace hot spares to redundant array of independent disks (RAID) set.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, redundant array of independent disks (RAID) system and telecommunications switch.

Storage area network and host processor systems using redundant array of independent disks (RAID) have been effectively using Serial Attached SCSI (SAS) (SCSI is an abbreviation for "Small Computer System Interface") for transfer of data and control information among the various disk drives and host processor (e.g., computer servers). SAS offers full duplex, dual-ported serial connections that support the most stringent of high-availability requirements. SAS uses point-to-point serial connections that may be easily scalable for high-speed shared bandwidth connections by integrating the multiple-ported serial connections on a very large scale integrated circuit (VLSI) device.

Typically, hot-sparing a hard disk drive (HDD) is accomplished with a SAS input-output controller (IOC) or a SAS RAID-on-chip (ROC) in a monolithic server. However, when an information handling system is comprised of a host processor(s) connected via SAS to just a bunch of disks (JBOD), SAS expanders with address zoning capabilities may be used to provide connectivity between the server(s) and the JBOD. The IOC or ROC on the host processor acts as a RAID engine that accesses the HDDs of the JBOD remotely through a zone allocated by the SAS expanders. Since the zone is fixed, the RAID engine cannot access any spare HDDs in the JBOD for hot-sparing.

SUMMARY OF THE INVENTION

Therefore what is needed is a RAID engine in an IOC or ROC device on a host processor, e.g., computer server, blade server, etc., that may communicate with a SCSI enclosure processor (SEP) in a SAS expander by using, for example, SCSI Enclosure Services (SES) commands. When a HDD fails, the IOC or ROC on the server RAID engine may use the SES command to indicate to the SEP of the SAS expander which HDD of a RAID set has failed. The SEP may then turn on a respective failed indicator, e.g., light emitting diode (LED) associated with the failed HDD of the RAID set, and the SEP re-assign a hot-spare hard disk drive to the zone of the failed hard disk drive.

The SEP of a SAS expander is aware of all SAS zones, including a zone of "free HDDs." When the SEP receives a command indicating which HDD has failed, the SEP will check the availability of free HDDs in any zone, and may then replace the failed HDD with an available hot-spare HDD by re-allocating this free hot-spare HDD to the zone associated with the failed HDD. By checking the SAS address from the SES command, the SEP will know which RAID engine on the host processor has to perform servicing of its RAID HDDs, e.g., rebuild the RAID set. The RAID engine may then discover that the failed HDD has been replaced and the RAID set rebuild process will begin.

According to a specific example embodiment of this disclosure, a method for detecting and replacing a failed serial attached SCSI (SAS) hard disk drive of a redundant array of independent disks (RAID) set in an information handling system having a SAS zoning expander may comprise: detecting a failure of a SAS hard disk drive of a RAID set with a RAID controller; notifying a SCSI enclosure processor (SEP) of the SAS hard disk drive failure, wherein the SEP is associated with a SAS zoning expander controlling access to a plurality of SAS zones and the failed SAS hard disk drive is assigned to one of the plurality of SAS zones; determining whether a SAS hot-spare hard disk drive is available in any of the plurality of SAS zones, wherein if the SAS hot-spare hard disk drive is available then assigning the SAS hot-spare hard disk drive to the one of the plurality of SAS zones of the failed SAS hard disk drive; detecting the SAS hot-spare hard disk drive with the RAID controller; and rebuilding the RAID set with the SAS hot-spare hard disk drive.

According to another specific example embodiment of this disclosure, a method for detecting and replacing a failed serial attached SCSI (SAS) hard disk drive of redundant array of independent disks (RAID) sets in an information handling system having SAS zoning expanders may comprise: detecting a failure of a SAS hard disk drive of a RAID set of a plurality of RAID sets with a RAID controller associated with that RAID set; notifying a SCSI enclosure processor (SEP) of the SAS hard disk drive failure, wherein the SEP is associated with a one SAS zoning expander of a plurality SAS zoning expanders, wherein the plurality of SAS zoning expanders control access to a plurality of SAS zones and the failed SAS hard disk drive is assigned to one of the plurality of SAS zones; determining whether a SAS hot-spare hard disk drive is available in any of the plurality of SAS zones, wherein if the SAS hot-spare hard disk drive is available then assigning the SAS hot-spare hard disk drive to the one of the plurality of SAS zones of the failed SAS hard disk drive; detecting the SAS hot-spare hard disk drive with the associated RAID controller; and rebuilding the failed RAID set of the plurality of RAID sets with the SAS hot-spare hard disk drive.

According to yet another specific example embodiment of this disclosure, an apparatus for detecting and replacing a failed serial attached SCSI (SAS) hard disk drive of a redundant array of independent disks (RAID) set in an information handling system having a SAS zoning expander may comprise: a host processor; a RAID controller coupled to the host processor; a SAS zoning expander coupled to the RAID controller; a SCSI enclosure processor (SEP) coupled to the SAS zoning expander; a plurality of first SAS hard disk drives arranged as a RAID set and coupled to the SAS zoning expander; at least one second SAS hard disk drive coupled to the SAS zoning expander; wherein the SAS zoning expander assigns the plurality of first SAS hard disk drives to a first SAS zone and the at least one second SAS hard disk drive to another SAS zone; wherein the RAID controller detects when a one of the plurality of first SAS hard disk drives of the RAID set fails and then notifies the SEP of the failure of the one of the plurality of first SAS hard disk drives of the RAID set; wherein the SEP reassigns the at least one second SAS hard disk drive to the first SAS zone; and wherein the RAID controller detects the at least one second SAS hard disk drive and rebuilds the RAID set with the at least one second SAS hard disk drive.

According to still another specific example embodiment of this disclosure, an information handling system having a plurality of host processors and associated redundant array of independent disks (RAID) sets may comprise: a plurality of host processors; a plurality of RAID controllers, each of the plurality of RAID controllers coupled to a respective one of the plurality of host processors; at least one SAS zoning expander coupled to the plurality of RAID controllers; a SCSI enclosure processor (SEP) coupled to the at least one SAS zoning expander; a plurality of first SAS hard disk drives coupled to the at least one SAS zoning expander, wherein a plurality of RAID sets are comprised of certain ones of the plurality of first SAS hard disk drives and each one of the plurality of RAID sets is assigned to a different SAS zone; at least one hot-spare SAS hard disk drive coupled to the at least one SAS zoning expander, the at least one hot-spare SAS hard disk drive being assigned to a SAS zone other than the different SAS zones assigned to the plurality of RAID sets; wherein when a one of the plurality of RAID controllers detects a failed one of the plurality of first SAS hard disk drives, the one of the plurality of RAID controllers notifies the SEP of the failure of the one of the plurality of first SAS hard disk drives; wherein the SEP reassigns the at least one hot-spare SAS hard disk drive to the SAS zone of the failed one of the plurality of first SAS hard disk drives; and wherein the one of the plurality of RAID controllers detects the at least one hot-spare SAS hard disk drive and rebuilds the associated one of the plurality of RAID sets with the at least one hot-spare SAS hard disk drive.

BRIEF DESCRIPTION OF THE DRAWINGS

A more complete understanding of the present disclosure thereof may be acquired by referring to the following description taken in conjunction with the accompanying drawings wherein.

Figure 1:
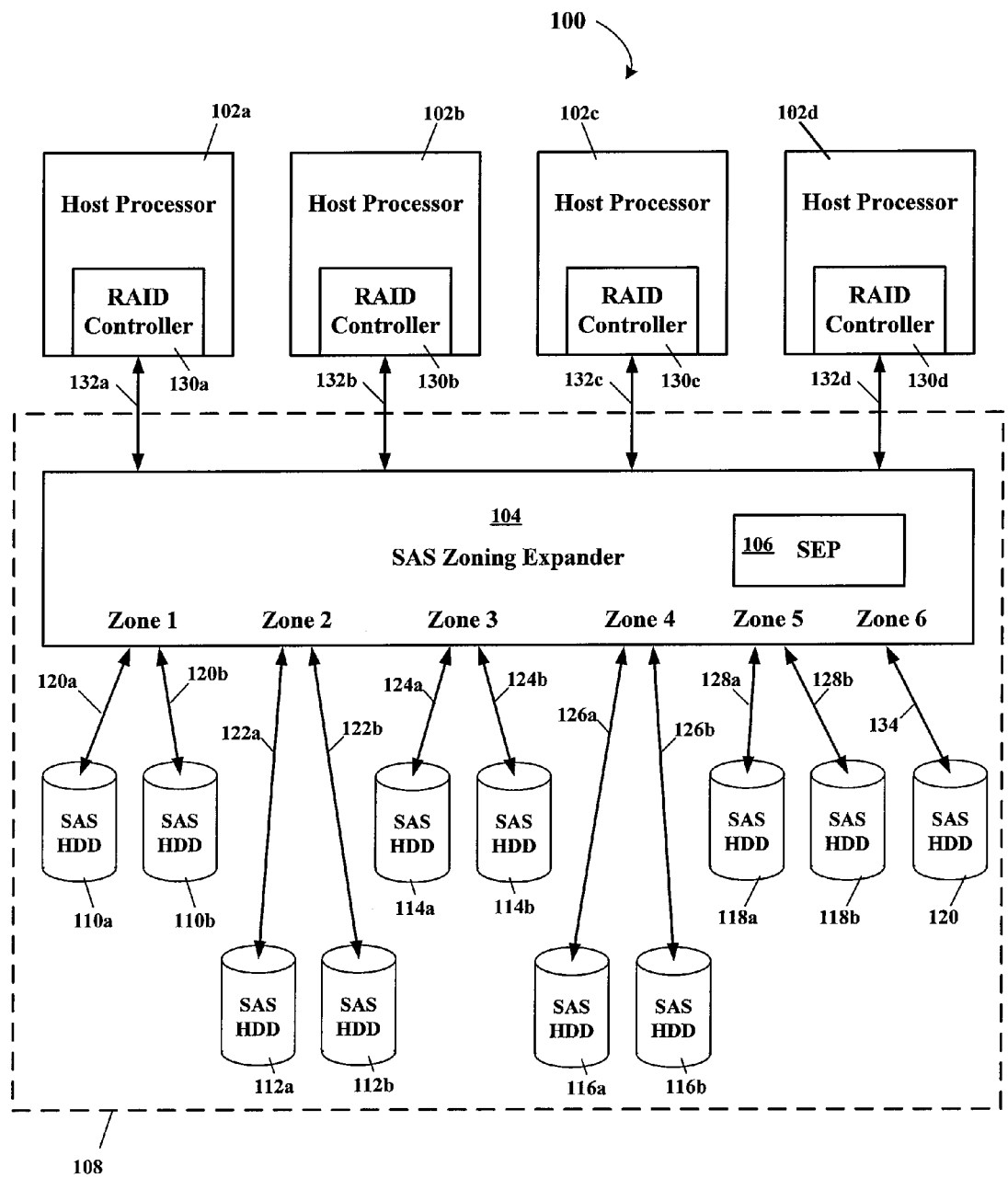
FIG. 1 is a schematic block diagram of a specific example embodiment of an information handling system having a plurality of SAS zoned hard disk drives and host processors; according to teachings of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of a specific exemplary embodiment of the present invention are schematically illustrated. Like elements in the drawings will be represented by like numbers, and similar elements will be represented by like numbers with a different lower case letter suffix.

Referring to FIG. 1, depicted is a schematic block diagram of a specific example embodiment of an information handling system having a plurality of SAS zoned hard disk drives and host processors; according to teachings of the present disclosure. A information handling system, generally represented by the numeral 100, may comprise a plurality of host processors 102, a RAID controller 130 associated with each of the plurality of host processors 102, a JBOD (just a bunch of disks) enclosure 108 comprising at least one SAS zoning expander 104 and a plurality of hard disk drives 110, 112, 114, 116, 118 and 120. The SAS zoning expander 104 has a SCSI enclosure processor (SEP) 106 that may be used to logically assign certain ones of the plurality of hard disk drives 110, 112, 114, 116, 118 and 120 to specific zones, e.g., hard disk drives 110a and 110b assigned to zone 1, hard disk drives 112a and 112b assigned to zone 2, hard disk drives 114a and 114b assigned to zone 3, hard disk drives 116a and 116b assigned to zone 4, hard disk drives 118a and 118b assigned to zone 5, and hard drive 120 assigned to zone 6.

As shown in FIG. 1, the hard disk drives in zones 1, 2, 3 and 4 are configured for RAID 1 (two disks, one mirroring the data on the other) and controlled by the respective RAID controllers 130. It is contemplated and with the scope of this disclosure that any RAID level(s), e.g., 1-10 may be utilized so long as there are a sufficient number of hard disk drives assigned in a zone that an appropriate RAID controller has permission to access. The RAID controller 130a has permission to access only the hard disk drives 110 assigned to zone 1. In a similar fashion, RAID controller 130b has permission to access only the hard disk drives 112 assigned to zone 2, RAID controller 130c has permission to access only the hard disk drives 114 assigned to zone 3, and RAID controller 130d has permission to access only the hard disk drives 116 assigned to zone 4. The hard disk drives 118 are the hot-spares and are assigned to zone 5. The hard disk drive 120 is a failed drive that has been moved into zone 6, the failed drive zone. Each of the RAID controllers 130 does not have permission to access any of the hard disk drives assigned to zone 5 or zone 6. The SEP 106 of the SAS zoning expander 104 determines which of the hard disk drives are assigned to a particular zone. These assignments may be stored and updated in a zone permission table (not shown) of the SAS zoning expander 104.

When one of the RAID hard disk drives fails, for example, hard disk drive 110b fails, the associated RAID controller 130a may use a SES command to indicate to the SEP 106 that the hard disk drive 110b has failed (e.g., send a SES SEND DIAGNOSTIC command with the Request Fault bit set to one in the Array Device element of the Enclosure Control diagnostic page for the element representing the failed drive). The SEP 106 will then re-assign one of the hot-spare hard disk drives 118 from zone 5 to zone 1, and the failed drive to zone 6. Now the RAID controller 130a has permission to access the hard disk drive 118 reassigned to zone 1 so that the RAID set may be rebuilt once the RAID controller 130a discovers that there is a good hard disk drive accessible in zone 1, which will occur because a BROADCAST (CHANGE) is generated for the zoning change as defined in SAS. Thus there may be any number of hot-spare hard disk drives 118 that may be available for re-assignment to any zone in which a RAID set hard disk drive has failed. When the failed drive that was moved to zone 6 is replaced (i.e., the SEP 106 detects that the ATTACHED SAS ADDRESS changes, then the SEP 106 moves the newly inserted drive to zone 5 as a new hot spare. The SAS zoning expander 104 may be included with the JBOD 108 or may be external thereto. SAS physical links 132 couple each RAID controller 130 to the SAS zoning Expander 104, and SAS physical links 120-128 and 134 couple the SAS hard disk drives to the SAS zoning Expander 104.

Figure 2:
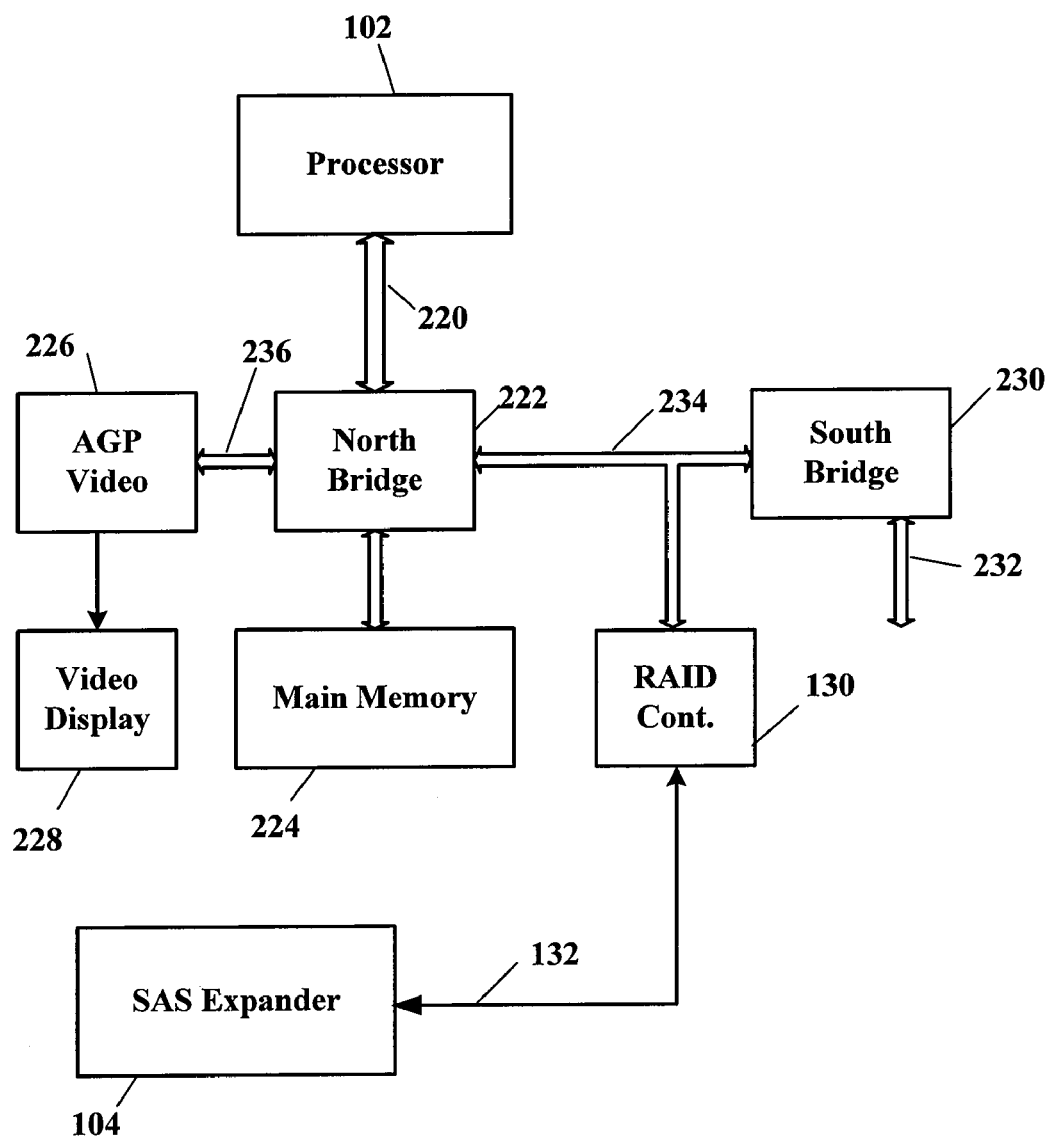
FIG. 2 is a schematic block diagram of a typical host processor and expander of the information handling system shown in FIG. 1.

Referring to FIG. 2, depicted is a schematic block diagram of a typical host processor and expander of the information handling system shown in FIG. 1. The host processor 102 may have electronic components mounted on at least one printed circuit board (PCB) (motherboard) and communicating data and control signals therebetween over signal buses. A processor(s) 102 (dual or four processors may also be implemented) may be coupled to a host bus 220. A north bridge 222, which may also be referred to as a memory controller hub or a memory controller, is coupled to a main system memory 224. The north bridge 222 is coupled to the processor(s) 210 via the host bus 220. The north bridge 222 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 222. The chip set may also be packaged as an application specific integrated circuit (ASIC). The north bridge 222 typically includes functionality to couple the main system memory 224 to other devices within the information handling system 100. Thus, memory controller functions such as main memory control functions typically reside in the north bridge 222. In addition, the north bridge 222 provides bus control to handle transfers between the host bus 220 and a second bus(es), e.g., PCI bus 234, AGP bus 236 coupled to a video graphics interface 226 which drives a video display 228. A second bus(es) 232 may also comprise other industry standard buses or proprietary buses, e.g., ISA, SCSI, USB buses through a south bridge(s) (bus interface) 230. An input-output processor (IOP), e.g., RAID controller 116 may be coupled to the north bridge 222, and to the SAS expander 106 through, for example, a SAS physical link 132 (more than one SAS physical link may be utilized).

Figure 3:
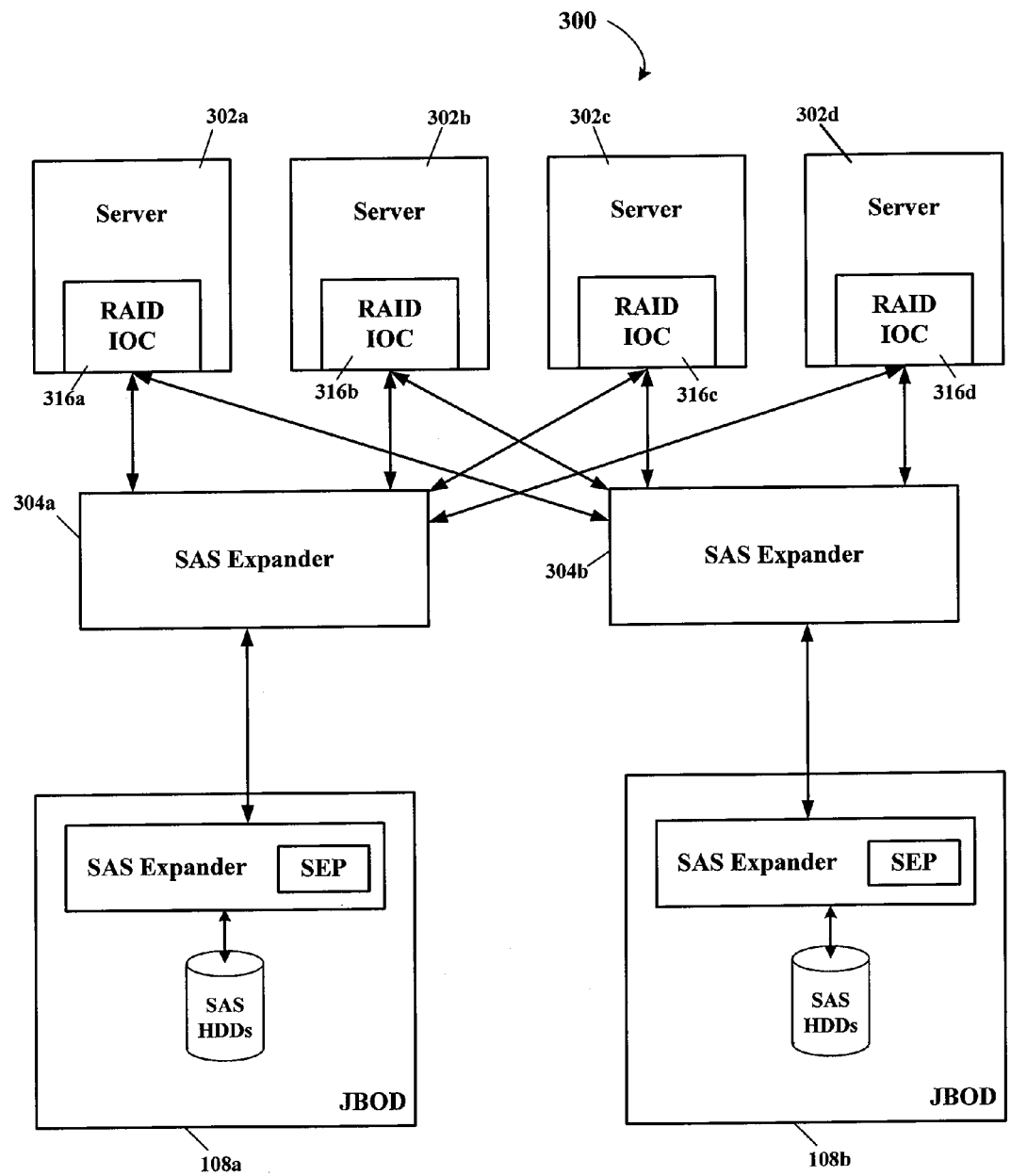
FIG. 3 is a schematic block diagram of another specific example embodiment of an information handling system having a plurality of cross-coupled SAS expanders, a plurality of JBOD, and a plurality of servers; according to teachings of the present disclosure.

Referring to FIG. 3, depicted is a schematic block diagram of another specific example embodiment of an information handling system having a plurality of SAS expanders, a plurality of JBOD, and a plurality of servers; according to teachings of the present disclosure. The information handing system, generally represented by the numeral 300, comprises a plurality of servers 302, e.g., blade servers, wherein each of the plurality of servers 302 has a RAID input-output controller (IOC) 316. A plurality of SAS expanders 304 may be coupled to a plurality of JBODs 108. Each of the JBODs 108 may function as described in reference to FIG. 1. Since the SEPs of the SAS expanders are aware of all of the hard disk drives and to what zones each of the hard disk drives are assigned, it is an easy matter for a hard disk drive zone assignment to be changed to an appropriate zone when needed. SCSI management protocol (SMP) may be used to manage the SAS system point-to-point topology, and the SAS zoning expanders may use their respective SEPs to discover, assign, and reassign all hard disk drives of the information handling system to any zone(s) as needed.

Thus, legacy SAS devices, e.g., hard disk drives, RAID controllers, processors, etc., may be utilized according to the teaching of this disclosure. The RAID controller 130 will determine when a RAID hard disk drive malfunctions, and will inform the SEP 106 of the JBOD 108 that its hard disk has failed. The SEP 106 may determine which zone needs a hot-spare hard disk drive and will reassign a good hard disk drive to that zone. The SEP may also turn on a failure indicator associated with the failed hard disk drive so that the failed hard disk drive may be easily recognized and quickly replaced. Once the RAID controller 130 determines that another good hard disk is now available, e.g., a new hard disk appears in the appropriate zone, the RAID controller 130 will rebuilt the RAID set.

Figure 4:
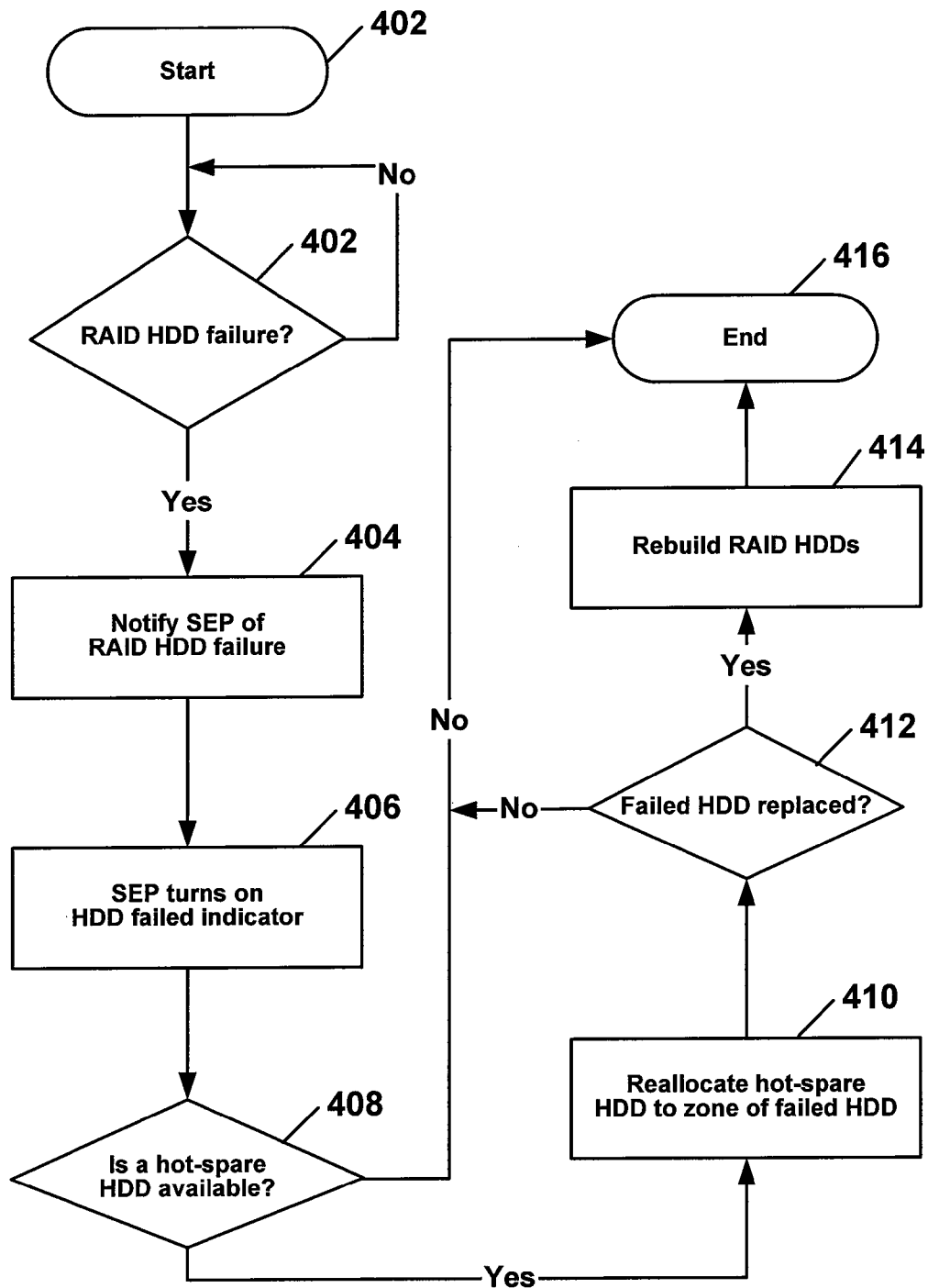
FIG. 4 is a schematic flow diagram of the steps for detection of a failed hard disk drive, rezoning of a hot-spare hard disk drive and rebuilding of the RAID set having the failed hard disk drive, according to teachings of the present disclosure.

Referring to FIG. 4, depicted is a schematic flow diagram of the steps for detection of a failed hard disk drive, rezoning of a hot-spare hard disk drive and rebuilding of the RAID set having the failed hard disk drive, according to teachings of the present disclosure. In step 402 the hard disk drive failure detection and replacement starts. In step 402, a determination is made if a hard disk drive of a RAID set fails, and when failure of a hard disk drive of a RAID set is determined, the SEP of a JBOD containing the failed hard disk drive is notified in step 404. In step 406, the SEP may turn on a failure indicated for the failed hard disk drive so as to facilitate replacement thereof. In step 408, a determination is made whether a hot-spare hard disk drive is available. This determination of the availability of a hot-spare hard disk drive may be irrespective of what zone or zones the hot-spare hard disk drive is assigned. If there is an available hot-spare hard disk drive, then in step 410 that hot-spare hard disk drive is relocated to the zone of the failed hard disk drive and the failed drive is moved to the failed drive zone. In step 412, once the RAID controller recognizes that another good hard disk drive is available, e.g., the hot-spare disk drive is now in the zone of that RAID controller, the RAID set may be rebuilt by the RAID controller in step 414. After rebuilding of the RAID set on the new hard disk drive, the process ends in step 416. If a hot-spare hard disk drive is determined in step 408 not to be available, or the failed hard disk drive is determined in step 412 not to have been replaced, the process ends in step 416 without the RAID image being rebuilt.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for detecting and replacing a failed serial attached SCSI (SAS) hard disk drive of a redundant array of independent disks (RAID) set in an information handling system having a SAS zoning expander, said method comprising the steps of:
    detecting a failure of a SAS hard disk drive of a RAID set with a RAID controller;
    notifying a SCSI enclosure processor (SEP) of the SAS hard disk drive failure, wherein the SEP is associated with a SAS zoning expander controlling access to a plurality of SAS zones and the failed SAS hard disk drive is assigned to one of the plurality of SAS zones;
    determining whether a SAS hot-spare hard disk drive is available in the SAS zone configured to contain SAS hot-spare hard disk drives, wherein if the SAS hot-spare hard disk drive is available then assigning the SAS hot-spare hard disk drive to the one of the plurality of SAS zones of the failed SAS hard disk drive;
    detecting the SAS hot-spare hard disk drive with the RAID controller; and
    rebuilding the RAID set with the SAS hot-spare hard disk drive.

2. The method according to claim 1, further comprising the step of turning on a failure indicator associated with the failed SAS hard disk drive.

3. The method according to claim 1, wherein a just a bunch of disks (JBOD) enclosure comprises a plurality of SAS hard disk drives, whereas the SAS hot-spare hard disk drive is one of the plurality of SAS hard disk drives in the JBOD enclosure.

4. The method according to claim 3, wherein the JBOD enclosure includes the SAS zoning expander and the SEP.

5. The method according to claim 1, wherein the RAID controller is part of a host server.

6. The method according to claim 5, wherein the host server is a blade server.

7. A method for detecting and replacing a failed serial attached SCSI (SAS) hard disk drive of redundant array of independent disks (RAID) sets in an information handling system having SAS zoning expanders, said method comprising the steps of:
    detecting a failure of a SAS hard disk drive of a RAID set of a plurality of RAID sets with a RAID controller associated with that RAID set;
    notifying a SCSI enclosure processor (SEP) of the SAS hard disk drive failure, wherein the SEP is associated with a one SAS zoning expander of a plurality SAS zoning expanders, wherein the plurality of SAS zoning expanders control access to a plurality of SAS zones and the failed SAS hard disk drive is assigned to one of the plurality of SAS zones;
    determining whether a SAS hot-spare hard disk drive is available in the SAS zone configured to contain SAS hot-spare hard disk drives, wherein if the SAS hot-spare hard disk drive is available then assigning the SAS hot-spare hard disk drive to the one of the plurality of SAS zones of the failed SAS hard disk drive;
    detecting the SAS hot-spare hard disk drive with the associated RAID controller; and
    rebuilding the failed RAID set of the plurality of RAID sets with the SAS hot-spare hard disk drive.

8. The method according to claim 7, further comprising the step of turning on a failure indicator associated with the failed SAS hard disk drive.

9. The method according to claim 7, wherein a plurality of just a bunch of disks (JBOD) enclosures each comprise a plurality of SAS hard disk drives, whereas the SAS hot-spare hard disk drive is one of the plurality of SAS hard disk drives in a one of the plurality of JBOD enclosures.

10. The method according to claim 9, wherein each of the plurality of JBOD enclosures includes a one of the plurality of SAS zoning expanders and a one of the associated SEPs.

11. The method according to claim 7, wherein each of the plurality of RAID controllers is associated with a one of a plurality of host servers.

12. The method according to claim 11, wherein the plurality of host server are a plurality of blade servers.

13. The method according to claim 7, wherein the plurality SAS zoning expanders are coupled together with SAS physical links.

14. An apparatus for detecting and replacing a failed serial attached SCSI (SAS) hard disk drive of a redundant array of independent disks (RAID) set in an information handling system having a SAS zoning expander, comprising:
    a host processor;
    a RAID controller coupled to the host processor;
    a SAS zoning expander coupled to the RAID controller;
    a SCSI enclosure processor (SEP) coupled to the SAS zoning expander;
    a plurality of first SAS hard disk drives arranged as a RAID set and coupled to the SAS zoning expander;
    at least one second SAS hard disk drive coupled to the SAS zoning expander;
    wherein the SAS zoning expander assigns the plurality of first SAS hard disk drives to a first SAS zone and the at least one second SAS hard disk drive to another SAS zone;
    wherein the RAID controller detects when a one of the plurality of first SAS hard disk drives of the RAID set fails and then notifies the SEP of the failure of the one of the plurality of first SAS hard disk drives of the RAID set;
    wherein the SEP reassigns the at least one second SAS hard disk drive to the first SAS zone; and
    wherein the RAID controller detects the at least one second SAS hard disk drive and rebuilds the RAID set with the at least one second SAS hard disk drive.

15. The apparatus according to claim 14, further comprising a failure indicator associated with the failed one of the plurality of first SAS hard disk drives, the failure indicator being turned on by the SEP.

16. The apparatus according to claim 14, wherein the plurality of first SAS hard disk drives and the at least one second SAS hard disk drive are enclosed in a just a bunch of disks (JBOD) enclosure.

17. The apparatus according to claim 16, wherein the SAS zoning expander and SEP are enclosed in the JBOD enclosure.

18. The apparatus according to claim 14, wherein the host processor is a host server.

19. The apparatus according to claim 14, wherein the host processor is a blade server.

20. The apparatus according to claim 14, further comprising:
    a plurality of host servers each having a RAID input-output controller (IOC) coupled to the SAS zoning expander; and
    a plurality of RAID sets comprising a plurality of SAS hard disk drives coupled to the SAS zoning expander, wherein each of the RAID sets is assigned to a different zone that is in the same zone as an associated RAID IOC.

21. An information handling system having a plurality of host processors and associated redundant array of independent disks (RAID) sets, said system comprising:
    a plurality of host processors;
    a plurality of RAID controllers, each of the plurality of RAID controllers coupled to a respective one of the plurality of host processors;
    at least one SAS zoning expander coupled to the plurality of RAID controllers;
    a SCSI enclosure processor (SEP) coupled to the at least one SAS zoning expander;
    a plurality of first SAS hard disk drives coupled to the at least one SAS zoning expander, wherein a plurality of RAID sets are comprised of certain ones of the plurality of first SAS hard disk drives and each one of the plurality of RAID sets is assigned to a different SAS zone;
    at least one hot-spare SAS hard disk drive coupled to the at least one SAS zoning expander, the at least one hot-spare SAS hard disk drive being assigned to a SAS zone other than the different SAS zones assigned to the plurality of RAID sets;
    wherein when a one of the plurality of RAID controllers detects a failed one of the plurality of first SAS hard disk drives, the one of the plurality of RAID controllers notifies the SEP of the failure of the one of the plurality of first SAS hard disk drives;
    wherein the SEP reassigns the at least one hot-spare SAS hard disk drive to the SAS zone of the failed one of the plurality of first SAS hard disk drives; and
    wherein the one of the plurality of RAID controllers detects the at least one hot-spare SAS hard disk drive and rebuilds the associated one of the plurality of RAID sets with the at least one hot-spare SAS hard disk drive.

22. The system according to claim 21, wherein each of the plurality of first SAS hard disk drives has a failure indicator actuated by the SEP when a respective one of the plurality of first SAS hard disk drives fails.

23. The system according to claim 21, wherein the plurality of host processors are a plurality of blade servers.

* * * * *